United States Patent
Gorelchenko et al.

(10) Patent No.: US 10,590,032 B2
(45) Date of Patent: Mar. 17, 2020

(54) METHODS AND APPARATUS FOR IMPROVING RELIABILITY OF COVER SUBSTRATE AGAINST IMPACT FRACTURES

(71) Applicant: CORNING INCORPORATED, Corning, NY (US)

(72) Inventors: Petr Gorelchenko, Painted Post, NY (US); Jason Thomas Harris, Horseheads, NY (US); Guangli Hu, Berkeley Heights, NJ (US); Khaled Layouni, Moncourt-Fromonville (FR); Po-Jen Shih, Vancouver, WA (US); Bin Zhang, Penfield, NY (US)

(73) Assignee: CORNING INCORPORATED, Corning, NY (US)

( * ) Notice: Subject to any disclaimer, the term of this patent is extended or adjusted under 35 U.S.C. 154(b) by 121 days.

(21) Appl. No.: 15/514,596

(22) PCT Filed: Oct. 22, 2015

(86) PCT No.: PCT/US2015/056793
§ 371 (c)(1),
(2) Date: Mar. 27, 2017

(87) PCT Pub. No.: WO2016/065089
PCT Pub. Date: Apr. 28, 2016

(65) Prior Publication Data
US 2017/0226004 A1 Aug. 10, 2017

Related U.S. Application Data

(60) Provisional application No. 62/169,239, filed on Jun. 1, 2015, provisional application No. 62/067,045, filed on Oct. 22, 2014.

(51) Int. Cl.
*B32B 17/06* (2006.01)
*C03C 17/00* (2006.01)
(Continued)

(52) U.S. Cl.
CPC .......... *C03C 17/007* (2013.01); *B32B 17/064* (2013.01); *C03C 17/32* (2013.01);
(Continued)

(58) Field of Classification Search
CPC ... C03C 21/001–006; B32B 3/02; B32B 3/10; B32B 3/20; B32B 3/26;
(Continued)

(56) References Cited

U.S. PATENT DOCUMENTS 1,785,401 A * 12/1930 Zuckerberg ............ B24B 19/00
428/141
2,779,136 A * 1/1957 Stookey ................ C03C 21/002
216/97
(Continued)

FOREIGN PATENT DOCUMENTS

CN 202784250 U 3/2013
DE 112010005568 T5 4/2013
(Continued)

OTHER PUBLICATIONS

International Search Report and Written Opinion of the International Searching Authority; PCT/US2015/056793; dated Apr. 25, 2016.
(Continued)

*Primary Examiner* — Megha M Gaitonde
(74) *Attorney, Agent, or Firm* — Kevin M. Johnson (57) ABSTRACT

A substrate having inner and outer major surfaces, a plurality of edge surfaces, and a plurality of corner surfaces; and at least one of: (i) a coating applied over a limited area of the outer major surface of the substrate to produce a composite
(Continued)

structure, (ii) an intermediate layer applied to the inner major surface of the substrate, and (iii) an elongate discontinuity disposed at one or more corners of the substrate, each of which operates to reduce catastrophic failures in the substrate resulting from a dynamic sharp impact to the outer major surface of the substrate.

15 Claims, 7 Drawing Sheets

(51) Int. Cl.
  *C03C 17/32* (2006.01)
  *H04M 1/18* (2006.01)
(52) U.S. Cl.
  CPC .... *B32B 2553/02* (2013.01); *C03C 2217/445* (2013.01); *C03C 2217/465* (2013.01); *C03C 2217/47* (2013.01); *C03C 2217/475* (2013.01); *C03C 2217/48* (2013.01); *C03C 2218/15* (2013.01); *C03C 2218/365* (2013.01); *H04M 1/185* (2013.01)
(58) Field of Classification Search
  CPC ......... B32B 3/266; B32B 5/142; B32B 5/145; B32B 17/064; B32B 17/10018; B32B 17/10293; B32B 27/04; Y10T 428/24119; Y10T 428/24157; Y10T 428/24273; Y10T 428/24289; Y10T 428/24298; Y10T 428/24314; Y10T 428/24322; Y10T 428/24355; Y10T 428/24364; Y10T 428/24405; Y10T 428/24479; Y10T 428/24488; Y10T 428/24496; Y10T 428/24504; Y10T 428/24512; Y10T 428/24521; Y10T 428/24537; Y10T 428/2457; Y10T 428/24587; Y10T 428/24612; Y10T 428/2462; Y10T 428/24793; Y10T 428/24802; Y10T 428/24851; Y10T 428/24926; G02F 2201/503
  USPC ......... 428/38, 116, 117, 131, 133, 134, 136, 428/137, 141, 142, 147, 156, 157, 158, 428/159, 160, 161, 163, 167, 169, 172, 428/173, 192, 194, 195.1, 201, 210, 211.1
  See application file for complete search history.

(56) References Cited

U.S. PATENT DOCUMENTS

| | | | |
|---|---|---|---|
| 5,250,321 A | * | 10/1993 | Andersson ............... B41M 1/12 101/126 |
| 7,551,430 B2 | | 6/2009 | Chen et al. |
| 7,697,275 B2 | | 4/2010 | Chen et al. |
| 7,966,785 B2 | | 6/2011 | Zadesky et al. |
| 8,088,475 B2 | | 1/2012 | Sasaki et al. |
| 8,186,117 B2 | | 5/2012 | Eren |
| 8,248,777 B2 | | 8/2012 | Prest |
| 8,305,744 B2 | | 11/2012 | Shedletsky |
| 8,434,951 B2 | | 5/2013 | Wittenberg et al. |
| 8,587,939 B2 | | 11/2013 | McClure et al. |
| 8,866,379 B2 | | 10/2014 | Jang |
| 9,235,240 B2 | | 1/2016 | Pakula et al. |
| 2006/0246299 A1 | | 11/2006 | Brady et al. |
| 2010/0299978 A1 | | 12/2010 | Werners et al. |
| 2011/0187245 A1 | | 8/2011 | Pakula et al. |
| 2013/0011683 A1 | | 1/2013 | Busman et al. |
| 2013/0068279 A1 | | 3/2013 | Buller et al. |
| 2014/0106141 A1 | | 4/2014 | Bellman et al. |
| 2014/0106146 A1 | | 4/2014 | Decker et al. |
| 2014/0106150 A1 | | 4/2014 | Decker et al. |
| 2014/0262849 A1 | | 9/2014 | Karp et al. |
| 2015/0174861 A1 | | 6/2015 | Hasegawa et al. |
| 2016/0107928 A1 | | 4/2016 | Bayne et al. |
| 2016/0286671 A1 | | 9/2016 | Ahmed et al. |

FOREIGN PATENT DOCUMENTS

| | | |
|---|---|---|
| EP | 1659423 | 5/2006 |
| JP | 2002228983 A | 8/2002 |
| JP | 2008003315 A | 1/2008 |
| JP | 2012214699 A | 11/2012 |
| JP | 2013224965 A | 10/2013 |
| KR | 100614855 B1 | 8/2006 |
| WO | 2014059411 A1 | 4/2014 |
| WO | 16172292 | 10/2016 |

OTHER PUBLICATIONS

English Translation of CN201580070008.8 First Office Action dated Jul. 3, 2019, China Patent Office, 8 Pgs.

Japanese Patent Application No. 2017521545; Machine Translation of the Office Action dated Oct. 2, 2019; Japan Patent Office; 5 Pgs.

* cited by examiner

METHODS AND APPARATUS FOR IMPROVING RELIABILITY OF COVER SUBSTRATE AGAINST IMPACT FRACTURES

This application is a national stage entry of International Patent Application Serial No. PCT/US15/56793 filed on Oct. 22, 2015, which claims the benefit of priority under 35 U.S.C. § 119 of U.S. Provisional Application Ser. No. 62/169,239 filed on Jun. 1, 2015 and U.S. Provisional Application Ser. No. 62/067,045 filed on Oct. 22, 2014 the content of which is relied upon and incorporated herein by reference in its entirety.

BACKGROUND

The present disclosure relates to methods and apparatus for improving reliability of a cover substrate against impact fractures, for example, for substrates including glass substrates, crystalline substrates, single crystal substrates, glass ceramic substrates, etc.

Many consumer and commercial products employ a sheet of high-quality cover glass to protect critical devices within the product, provide a user interface for input and/or display, and/or many other functions. For example, mobile devices, such as smart phones, mp3 players, computer tablets, etc., often employ one or more sheets of high strength glass on the product to both protect the product and achieve the aforementioned user interface. In 2013, more than 1 billion smartphones were shipped worldwide, which represented a 40% increase from the previous year. Some have predicted that 1.7 billion smartphones will be shipped in 2017.

In the above-noted applications, as well as others, the glass is preferably durable (e.g., scratch resistant and fracture resistant), transparent, and/or antireflective. Indeed, in a smart phone and/or tablet application, the cover glass is often the primary interface for user input and display, which means that the cover glass would preferably exhibit high durability and high optical performance characteristics. Among the evidence that the cover glass on a product may manifest exposure to harsh operating conditions, fractures (e.g., cracks) and scratches are probably the most common. Such evidence suggests that sharp contact, single-event damage is the primary source of visible cracks (and/or scratches) on cover glass in mobile products. Since 2007, some have estimated that damaged smartphones have cost consumers in America about 5.9 billion dollars, where 76% of such damage was caused by dropping the smartphone to the ground.

Once a significant crack or scratch mars the cover glass of a user input/display element, the appearance of the product is degraded and the resultant increase in light scattering may cause significant reduction in the performance of the display. Significant cracks and/or scratches can also affect the accuracy and reliability of touch sensitive displays. As a single severe crack and/or scratch, and/or a number of moderate cracks and/or scratches, are both unsightly and can significantly affect product performance, they are often the leading complaint of customers, especially for mobile devices such as smart phones and/or tablets.

In order to reduce the likelihood of cracking and/or scratching the cover glass of a product, it has been proposed to increase the hardness of the cover glass to about 15 GPa or higher. One approach to increasing the hardness of a given glass substrate is to apply a film coating or layer to the glass substrate to produce a composite structure that exhibits a higher hardness as compared to the bare glass substrate.

For example, a diamond-like carbon coating may be applied to a glass substrate to improve hardness characteristics of the composite structure. Indeed, diamond exhibits a hardness of 100 GPa; however, such material is used sparingly due to high material costs. Further, although a coating on a glass substrate may improve the hardness of the structure, and thereby improve the resistance to cracks and/or scratches, it has been discovered that the coating may degrade other characteristics of the substrate, such as the flexural strength of the glass substrate and/or the strain to failure of the glass substrate. The reduction in the strength and/or strain to failure of the glass substrate may manifest in a higher susceptibility to cracks, particularly deep cracks.

Accordingly, there are needs in the art for new methods and apparatus for achieving high hardness coatings on substrates, such as glass substrates, crystalline substrates, single crystal substrates, glass ceramic substrates, etc., and to avoid failure of the substrates in the even of an impact.

SUMMARY

For purposes of discussion, the disclosure herein may often refer to methodologies and apparatus involving cover substrates formed from glass; however, skilled artisans will realize that the methodologies and apparatus herein apply to substrates of numerous kinds, including glass substrates, crystalline substrates, single crystal substrates, glass ceramic substrates, other materials subject to sharp contact failures, etc.

By way of example, a substrate may be formed from an oxide glass, such as Gorilla® Glass, which is available from Corning Incorporated, and which has been widely used as a cover glass in the above-noted consumer electronics products. Such glass is used in applications where the strength and/or strain to failure of conventional glass are insufficient to achieve desired performance levels. Gorilla® Glass is manufactured by chemical strengthening (ion exchange) in order to achieve high levels of strength while maintaining desirable optical characteristics (such as high transmission, low reflectivity, and suitable refractive index). Glass compositions that are suitable for ion-exchange include alkali aluminosilicate glasses or alkali aluminoborosilicate glasses, although other glass compositions are possible. Ion exchange (IX) techniques can produce high levels of compressive stress in the treated glass and are suitable for thin glass substrates.

Figure 1:
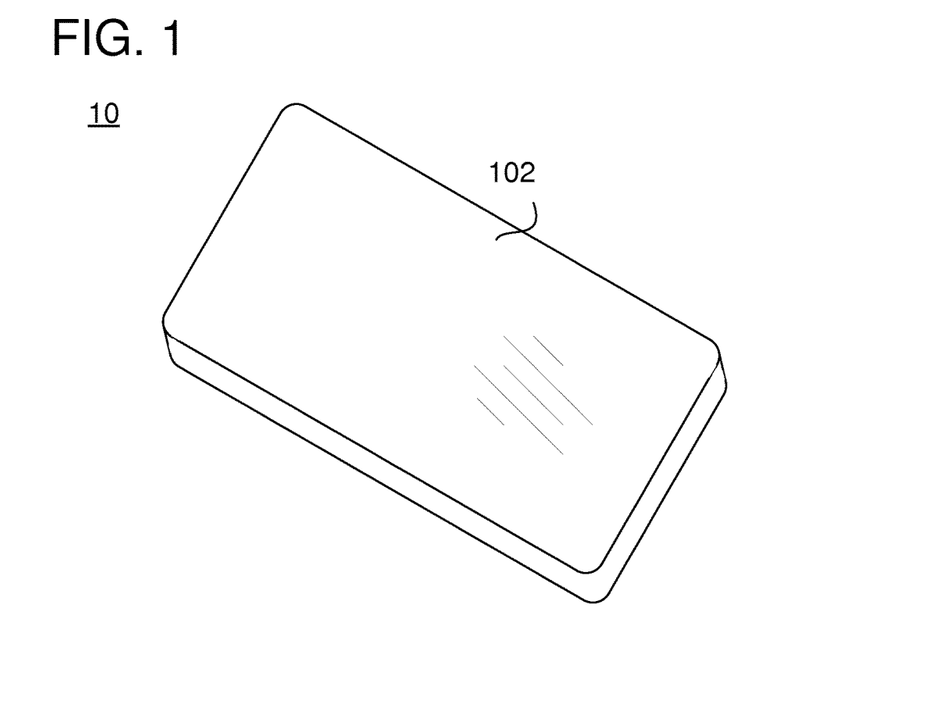
FIG. 1 is a schematic illustration of a consumer device having a cover substrate, such as a glass substrate.
Figure 2:
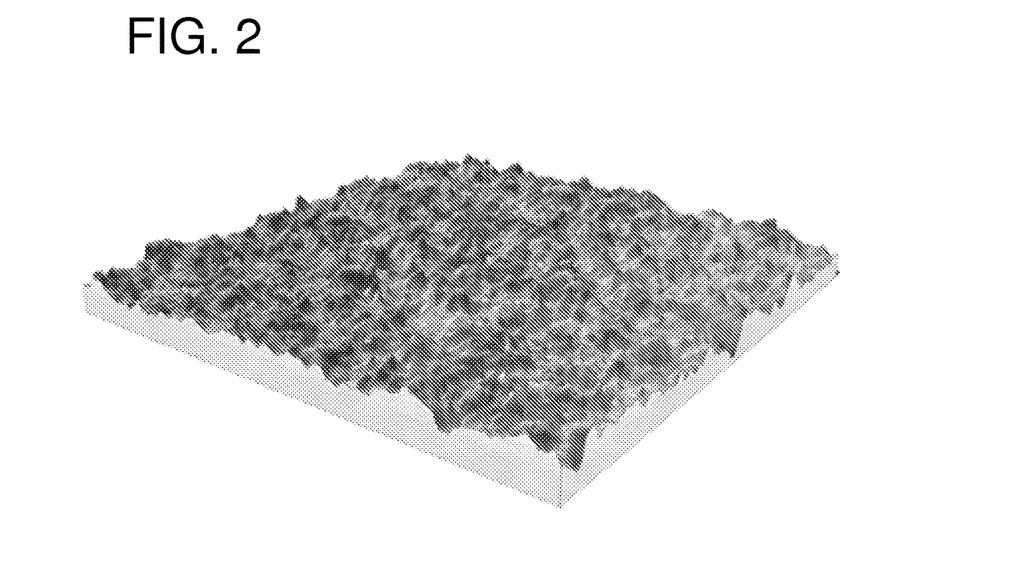
FIG. 2 is an illustration of feature sizes of a hard ground surface (such as granite) on which the device of FIG. 1 might come into contact.

Despite its high strength and/or strain to failure, Gorilla® Glass has been found to fracture when subjected to drops to the ground. For example, with reference to FIG. 1, a consumer device 10 (such as a smartphone) may include a cover substrate 102 on at least one major side thereof. The cover substrate 102 may be formed from any number of materials, including glass substrates, crystalline substrates, single crystal substrates, glass ceramic substrates, etc. As noted above, a major cause of fracture of the cover substrate 102 is a ground strike. FIG. 2 is an illustration of the feature size of a hard ground surface (such as granite), which may exhibit 10 mm in-plane feature sizes and peaks of several hundred micrometers. Drops to the ground may cause failure in the glass substrate 102 when some portion of the device 10, especially the cover substrate 102, strikes the ground.

It has been discovered that there are two major failure modes of the cover substrate 102, such as a glass substrate, when the device 10 drops to the ground. The first failure mode is flexure failure, caused by significant bending of the cover substrate 102 when the device 10 is subjected to a dynamic load caused by impact with the ground. Notably, some glass substrates exhibiting high flexural strength, such as the aforementioned Gorilla® Glass, may be resistant to fractures caused by the flexure failure mode. Indeed, the ion exchange technique used in producing Gorilla® Glass results in compressive stress on the surface of the glass and therefore resists flexure failures.

The second failure mode involves sharp contact failures, caused by a sharp indentation on a surface of the cover substrate 102 when it impacts the ground. For example, in the case of a glass substrate 102, while Gorilla® Glass may exhibit improved resistance to flexure failure, dynamic sharp contact failures are still problematic as such failures are characterized by very high stress concentrations caused by local indentation from the contact object. It has been discovered that among reported cover glass failures resulting from device 10 drops, 92% of the damage to a glass substrate 102 is caused by sharp contact failures. In addition, among these sharp contact failures, most were caused by impacts to the edges and/or corners of the glass substrate 102.

The disclosure herein addresses the problem of sharp contact failures in different ways, which may be used independently or in combination.

One technique is to partially coat an outer surface of the cover substrate 102 in order to increase resistance to, and/or the effects of, sharp contact failures. This technique involves applying the coating only to certain areas of the cover substrate 102, such as only to edge areas and/or corner areas of the cover substrate 102 (where the probability of sharp contact is relatively high) and leaving a relatively large central area of the outer surface of the cover substrate 102 uncoated. The limitation on the surface area of the cover substrate 102 that is coated mitigates the reduction in flexural strength characteristics of the cover substrate 102 that would otherwise result from coating the entire outer surface of the cover substrate 102. As will be discussed in greater detail herein, the coating may be transparent, energy absorbing, plastically deformable, and/or ultra-hard, where the specific properties of the coating (e.g., energy absorbing, plastically deformable, or ultra-hard) may effect a reduction in the failure probability of the cover substrate 102 in different ways.

Said another way, the partial coating technique may result in an apparatus that includes a cover substrate 102 having inner and outer major surfaces spaced apart from one another, a plurality of edge surfaces spanning between respective peripheral edges of the inner and outer major surfaces, and a plurality of corner surfaces spanning between the respective peripheral edges of the inner and outer major surfaces and between adjacent ones of the edge surfaces. The apparatus may also include a coating applied over a limited area of the outer major surface of the cover substrate to produce a composite structure, the limited area being less than a total area of the outer major surface, where the coating operates to mitigate damage to the cover substrate from dynamic sharp impact to the outer major surface. In some embodiments, the coating absorbs kinetic energy from an impact. The limited area may include at least one edge area spanning between the peripheral edge and a first predetermined distance toward a central region of the outer major surface of the cover substrate. Additionally and/or alternatively, the limited area may include at least one corner area extending adjacent to at least one respective corner surface and spanning between the peripheral edge and a second predetermined distance toward a central region of the outer major surface of the cover substrate.

Another technique to address the problem of sharp contact failures is to provide one or more mechanisms to partition the cover substrate 102 in one or more strategic locations in order to isolate fracturing, mitigate crack propagation, and prevent fracturing of especially central areas of the cover substrate 102. Thus, even if the device 10 is dropped and a sharp impact failure initiates at, for example, a corner of the cover substrate 102, the partitioning would result in the arrest of any crack propagation toward and/or into the central area of the cover substrate 102. Due to the geometry of many devices 10, the corners of the cover substrate 102 are regions in which sharp impact failures are likely to initiate. Thus, strategic location of the partitioning mechanisms may result in preventing the propagation of cracks from the corners into the central areas of the cover substrate 102—and therefore improve the drop characteristics of the device 10 from the user's perspective.

Said another way, the isolation technique may result in an apparatus that includes a cover substrate 102 having inner and outer major surfaces spaced apart from one another, a plurality of edge surfaces spanning between respective peripheral edges of the inner and outer major surfaces, and a plurality of corner surfaces spanning between the respective peripheral edges of the inner and outer major surfaces and between adjacent ones of the edge surfaces. The apparatus may also include a first elongate discontinuity having a proximal end and a distal end, the proximal end being located at, or adjacent to, a first of the plurality of edge surfaces, and the distal end being located at, or adjacent to, a second of the plurality of edge surfaces, adjacent to the first of the plurality of edge surfaces, such that the first elongate discontinuity is disposed in proximity to a first of the corner surfaces of the cover substrate. The first elongate discontinuity may operate to interrupt crack propagation resulting from a dynamic sharp impact to the outer major surface of the cover substrate originating between the peripheral edge and the first elongate discontinuity. Additionally and/or alternatively, the first elongate discontinuity may operate to direct the crack propagation toward at least one of the first and second edge surfaces. Additionally and/or alternatively, the first elongate discontinuity may operate to mitigate crack propagation across the first elongate discontinuity toward a central region of the outer major surface of the cover substrate.

Another technique to address the problem of sharp contact failures is to provide an intermediate layer, such as an adhesive layer or coating, between the cover substrate and a body of the device on which the cover substrate is connected. The characteristics of the intermediate layer include the ability to absorb kinetic energy resulting from an impact to the cover substrate and reduce the likelihood of a failure.

Other aspects, features, and advantages will be apparent to one skilled in the art from the description herein taken in conjunction with the accompanying drawings.

DESCRIPTION OF THE DRAWINGS

For the purposes of illustration, there are forms shown in the drawings that are presently preferred, it being understood, however, that the embodiments disclosed and described herein are not limited to the precise arrangements and instrumentalities shown.

DETAILED DESCRIPTION OF THE PREFERRED EMBODIMENTS

As noted above, the disclosure herein addresses the problem of sharp contact failures in a cover substrate 102 by application of a partial coating and/or by way of isolating crack propagation after such has initiated. For purposes of discussion, the embodiments discussed below refer to a cover substrate 102 formed from glass, which is a preferred material. It is noted, however, that the embodiments may employ different materials to implement the cover substrate 102, such as crystalline substrates, single crystal substrates, glass ceramic substrates, other materials subject to sharp contact failures, etc.

Details of Glass Substrate

In connection with discussing solutions to the problem of sharp contact failures in a glass substrate 102, some background detail concerning the glass substrate 102 is believed to be beneficial. In this regard, reference is made to FIG. 3, which is a schematic illustration of a glass substrate 102 suitable for use in the consumer device 10 of FIG. 1 (and/or any of the other devices noted herein).

As concerns geometric characteristics, the illustrated examples presented herein will focus on a substantially planar structure, although other embodiments may employ a curved or otherwise shaped or sculpted glass substrate 102. Additionally or alternatively, the thickness of the glass substrate 102 may vary, for aesthetic and/or functional reasons, such as employing a higher thickness at edges of the glass substrate 102 as compared with more central regions.

Figure 3:
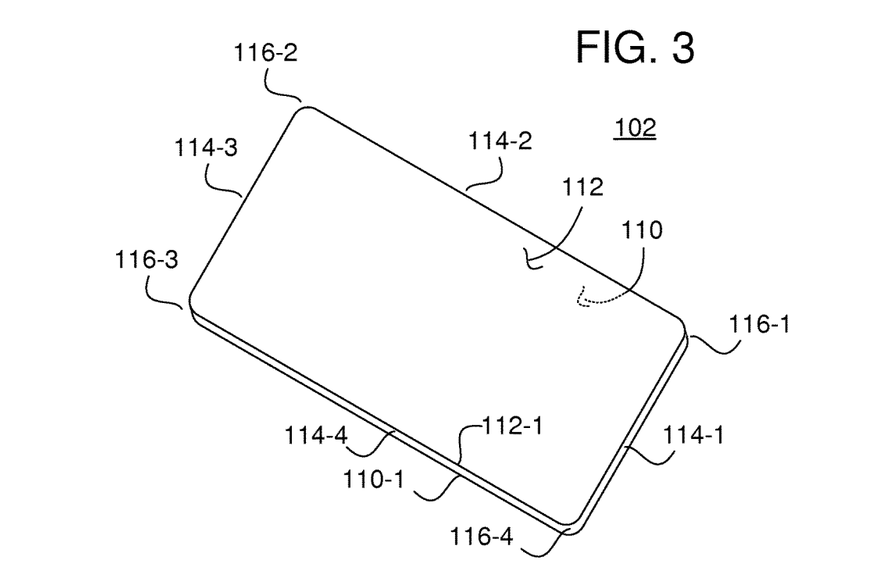
FIG. 3 is a schematic illustration of a cover substrate suitable for use in the consumer device of FIG. 1.

With reference to FIG. 3, the glass substrate 102 may include inner and outer major surfaces 110, 112 that are spaced apart from one another. Each of the inner and outer major surfaces 110, 112 may include a respective peripheral edge 110-1, 112-1 defining an outer contour or shape of the glass substrate 102. In the illustrated example, the outer contour of the glass substrate 102 is often employed in manufacturing smartphones and the respective peripheral edges 110-1, 112-1 are characterized by a pair of opposing (and relatively long) lateral edge segments, a pair of opposing (and relatively short) lateral edge segments, and four rounded corner segments. The glass substrate 102 may also include a plurality of edge surfaces 114, each spanning between respective peripheral edges 110-1, 112-1 of the inner and outer major surfaces 110, 112. In the illustrated example, edge surfaces 114-1 and 114-3 span between the relatively short lateral edge segments of the peripheral edges 110-1, 112-1, and edge surfaces 114-2 and 114-4 span between the relatively long lateral edge segments of the peripheral edges 110-1, 112-1. In addition, the glass substrate 102 may also include a plurality of corner surfaces 116, each spanning between the respective peripheral edges 110-1, 112-1 of the inner and outer major surfaces 110, 112, and each spanning between adjacent ones of the edge surfaces 114. In the illustrated example, a first corner surface 116-1 may span between the peripheral edges 110-1, 112-1 at a corner where adjacent edge surfaces 114-1 and 114-2 come together. Similarly, a second corner surface 116-2 may span between the peripheral edges 110-1, 112-1 at another corner where adjacent edge surfaces 114-2 and 114-3 come together. Further, a third corner surface 116-3 spans between the peripheral edges 110-1, 112-1 at still another corner where adjacent edge surfaces 114-3 and 114-4 come together, and a fourth corner surface 116-4 spans between the peripheral edges 110-1, 112-1 at still another corner where adjacent edge surfaces 114-4 and 114-1 come together.

As concerns material characteristics, the glass substrate 102 may be formed from non-ion exchanged glass or ion exchanged glass.

With respect to the glass substrate 102 being formed from ion exchanged glass, one may consider that such a substrate is formed from ion exchangeable glass, specifically a conventional glass material that is enhanced by chemical strengthening (ion exchange, IX). As used herein, "ion exchangeable" means that a glass is capable of exchanging cations located at or near the surface of the glass with cations of the same valence that are either larger or smaller in size. As noted above, one such ion exchangeable glass is Corning Gorilla® Glass available from Corning Incorporated.

Any number of specific glass compositions may be employed in providing the raw glass substrate 102. For example, ion-exchangeable glasses that are suitable for use in the embodiments herein include alkali aluminosilicate glasses or alkali aluminoborosilicate glasses, though other glass compositions are contemplated.

For example, a suitable glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass sheets include at least 6 mol. % aluminum oxide. In a further embodiment, a glass sheet includes one or more alkaline earth oxides, such that a content of alkaline earth oxides is at least 5 mol. %. Suitable glass compositions, in some embodiments, further comprise at least one of $K_2O$, $MgO$, and $CaO$. In a particular embodiment, the glass can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % $MgO$; and 0-3 mol. % $CaO$.

A further example glass composition suitable for forming hybrid glass laminates comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % $MgO$; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. %≤($Li_2O+Na_2O+K_2O$) 20 mol. % and 0 mol. %≤(MgO+CaO)≤10 mol. %.

A still further example glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. %≤($Li_2O+Na_2O+K_2O$)≤18 mol. % and 2 mol. % (MgO+CaO)≤7 mol. %.

In another embodiment, an alkali aluminosilicate glass comprises, consists essentially of, or consists of: 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

In a particular embodiment, an alkali aluminosilicate glass comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\sum \text{modifiers}} > 1,$$

where in the ratio the components are expressed in mol. % and the modifiers are alkali metal oxides. This glass, in particular embodiments, comprises, consists essentially of, or consists of: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\sum \text{modifiers}} > 1.$$

In yet another embodiment, an alkali aluminosilicate glass substrate comprises, consists essentially of, or consists of: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; wherein 12 mol. % $Li_2O+Na_2O+K_2O$ 20 mol. % and 0 mol. %≤MgO+CaO≤10 mol. %.

In still another embodiment, an alkali aluminosilicate glass comprises, consists essentially of, or consists of: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$SiO_2+B_2O_3+CaO$≤69 mol. %; $Na_2O+K_2O+B_2O_3+MgO+CaO+SrO$>10 mol. %; 5 mol. %≤MgO+CaO+SrO≤8 mol. %; ($Na_2O+B_2O_3$)≤$Al_2O_3$≤2 mol. %; 2 mol. %≤$Na_2O-Al_2O_3$≤6 mol. %; and 4 mol. %≤($Na_2O+K_2O$)≤$Al_2O_3$≤10 mol. %.

As to the specific process of exchanging ions at the surface of the raw glass substrate 102, ion exchange is carried out by immersion of the raw glass substrate 102 into a molten salt bath for a predetermined period of time, where ions within the raw glass substrate 102 at or near the surface thereof are exchanged for larger metal ions, for example, from the salt bath. The raw glass substrate may be immersed into the molten salt bath at a temperature within the range of about 400-500° C. for a period of time within the range of about 4-24 hours, and preferably between about 4-10 hours.

The incorporation of the larger ions into the glass strengthens the ion-exchanged glass substrate 102' by creating a compressive stress in a near surface region. A corresponding tensile stress is induced within a central region of the ion-exchanged glass substrate 102' to balance the compressive stress. Assuming a sodium-based glass composition and a salt bath of $KNO_3$, the sodium ions within the raw glass substrate 102 may be replaced by larger potassium ions from the molten salt bath to produce the ion-exchanged glass substrate 102'.

The replacement of smaller ions by larger ions at a temperature below that at which the glass network can relax produces a distribution of ions across the surface of the ion-exchanged glass substrate 102' that results in the aforementioned stress profile. The larger volume of the incoming ion produces a compressive stress (CS) on the surface and tension (central tension, or CT) in the center region of the ion-exchanged glass substrate 102'. The compressive stress is related to the central tension by the following relationship:

$$CS = CT\left(\frac{t - 2DOL}{DOL}\right)$$

where t is the total thickness of the glass substrate 102 and DOL is the depth of layer of the ion exchange, also referred to as depth of compressive layer. The depth of compressive layer will in some cases be greater than about 15 microns, and in some cases greater than 20 microns.

There are a number of options to the artisan concerning the particular cations available for the ion exchange process. For example, alkali metals are viable sources of cations for the ion exchange process. Alkali metals are chemical elements found in Group 1 of the periodic table, and specifically include: lithium (Li), sodium (Na), potassium (K), rubidium (RB), cesium (Cs), and francium (Fr). Although not technically an alkali metal, thallium (Tl) is another viable source of cations for the ion exchange process. Thallium tends to oxidize to the +3 and +1 oxidation states as ionic salts—and the +3 state resembles that of boron, aluminum, gallium, and indium. However, the +1 state of thallium oxidation invokes the chemistry of the alkali metals.

Partial Coating Technique

As noted above, one technique for increasing resistance to sharp contact failures involves partially coating one of the surfaces 110, 112, preferably the outer surface 112, of the glass substrate 102. Notably, a coating 104 is applied over a limited area of the outer major surface 112 of the glass substrate 102 to produce a composite structure. The limited area is less than a total area of the outer major surface 112, such that the coating 104 may operate to mitigate damage from dynamic sharp impact, yet also mitigate any reduction in the flexural strength of the glass substrate 102 from the coating 104 itself.

The technique involves applying the coating 104 only to certain areas of the glass substrate 102, such as only to edge areas and/or corner areas of the glass substrate 102 (where the probability of sharp contact is relatively high) and leaving a relatively large central area of the outer surface of the glass substrate 102 uncoated. The coating may be transparent, plastically deformable, and/or ultra-hard, where the specific properties of the coating 104 will be discussed in more detail below.

Partial Coating Area Definition

Figure 4:
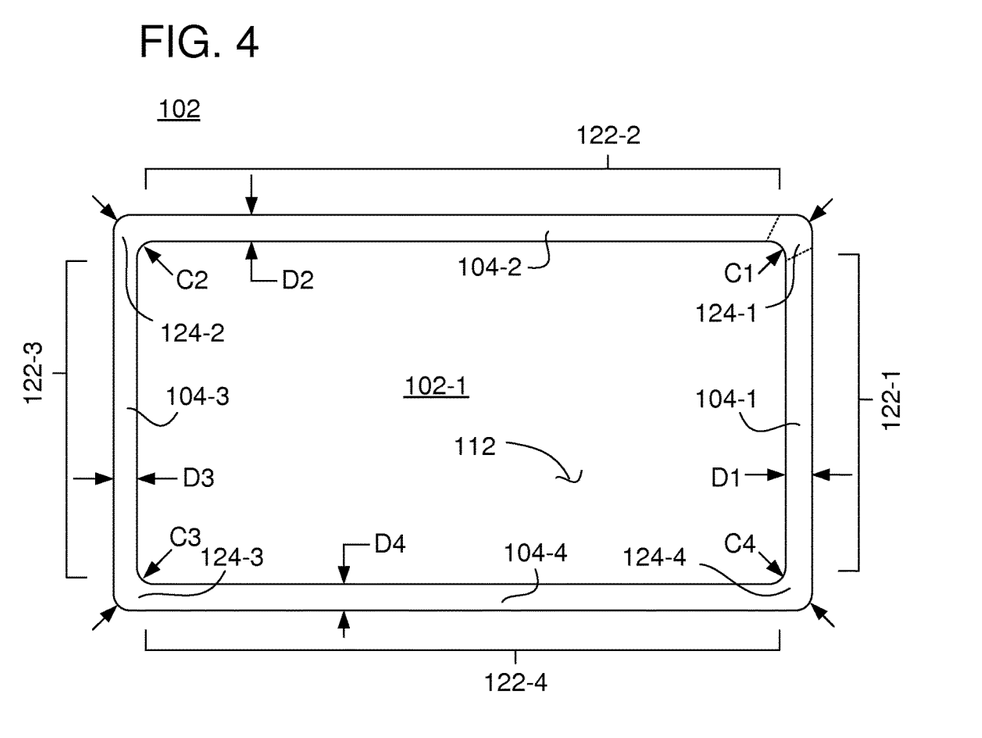
FIG. 4 is a schematic illustration of the cover substrate of FIG. 3 that has been partially coated in accordance with one or more embodiments herein.

As concerns the particular area(s) in which the coating 104 is applied, reference is made to FIG. 4, which is a schematic illustration of the glass substrate 102 that has been partially coated in accordance with one or more embodiments herein. The coating 104 may be applied to one or more partial areas, such as one or more edge areas 122 and/or one or more corner areas 124 on the outer major surface 112 of the glass substrate 102.

In one or more embodiments, each of the edge areas 122 may be defined by a respective partial edge area on the major surface 112 of the glass substrate 102 spanning between the peripheral edge 112-1 and one or more predetermined distances Di, inward from such peripheral edge 112-1, toward a central region 102-1 of the major surface 112 of the glass substrate 102. For example, a first partial edge area 122-1 may be defined on the outer major surface 112 of the glass substrate 102, extending longitudinally along a segment of the peripheral edge 112-1 that is adjacent to the relatively short lateral edge surface 114-1, and extending width-wise from the peripheral edge 112-1 towards the central region 102-1 of the outer major surface 112. As noted above, the width-wise extension of the first partial edge area 122-1 may be a predetermined distance D1. By way of further example, a second partial edge area 122-2 may be defined on the outer major surface 112 of the glass substrate 102, extending longitudinally along another segment of the peripheral edge 112-1 that is adjacent to the relatively long lateral edge surface 114-2, and extending width-wise from the peripheral edge 112-1 towards the central region 102-1 of the outer major surface 112. Again, the width-wise extension of the second partial edge area 122-2 may be a predetermined distance D2. Similarly, a third partial edge area 122-3 may extend longitudinally along still another segment of the peripheral edge 112-1 that is adjacent to the relatively short lateral edge surface 114-3, and extend width-wise from the peripheral edge 112-1 towards the central region 102-1 of the outer major surface 112 (where the width-wise extension may be a predetermined distance D3). Finally, a fourth partial edge area 122-4 may extend longitudinally along still another segment of the peripheral edge 112-1 that is adjacent to the other relatively long lateral edge surface 114-4, and extend width-wise from the peripheral edge 112-1 towards the central region 102-1 of the outer major surface 112 (where the width-wise extension may be a predetermined distance D4).

Additionally and/or alternatively, each of the corner areas 124 may be defined by a respective partial corner area on the major surface 112 of the glass substrate 102 extending peripherally and/or adjacent to one of the respective corner surfaces 116 and spanning between the peripheral edge 112-1 and a predetermined distance Ci, inward from such peripheral edge 112-1, toward the central region 102-1 of the outer major surface 112 of the glass substrate 102.

For example, a first partial corner area 124-1 may be defined on the outer major surface 112 of the glass substrate 102, extending peripherally along a segment of the peripheral edge 112-1 that is adjacent to the first corner surface 116-1, and extending width-wise from the peripheral edge 112-1 towards the central region 102-1 of the outer major surface 112. As noted above, the width-wise extension of the first partial corner area 124-1 may be a predetermined distance C1. By way of further example, a second partial corner area 124-2 may be defined on the outer major surface 112 of the glass substrate 102, extending peripherally along another segment of the peripheral edge 112-1 that is adjacent to the second corner surface 116-2, and extending width-wise from the peripheral edge 112-1 towards the central region 102-1 of the outer major surface 112 (e.g., where the width-wise extension is a predetermined distance C2). Similarly, a third partial corner area 124-3 may extend peripherally along yet another segment of the peripheral edge 112-1 that is adjacent to the third corner surface 116-3, and extend width-wise towards the central region 102-1 by a predetermined distance C3. Finally, a fourth partial corner area 124-4 may extend peripherally along yet another segment of the peripheral edge 112-1 that is adjacent to the fourth corner surface 116-4, and extend width-wise towards the central region 102-1 by a predetermined distance C4.

As noted above, any number of the individual partial edge areas 122-1, 122-2, 122-3, 122-4, may be coated with coating areas 104-1, 104-2, 104-3, 104-4, respectively, (or not coated) depending on design considerations. Additionally and/or alternatively, any number of the individual partial corner areas 124-1, 124-2, 124-3, 124-4, may be coated (or not coated) depending on design considerations. Further, the width-wise distances D1, D2, D3, D4 of the respective individual partial edge areas 122$i$, and/or the centrally directed distances C1, C2, C3, C4 of the respective individual partial corner areas 124$i$, may be any number of similar magnitudes or any number of differing magnitudes depending on the particular geometry, dimensioning, and application of the glass substrate 102.

It is preferred that the coated, limited area (represented by a summation of coating material that may exist on each of the partial area 122$i$ and 124$i$) is substantially less than the total area of the outer surface 112 of the glass substrate 102. For example, no more than one of: (i) about 1 to 20 percent of the total area of the outer major surface 112; (ii) about 1 to 10 percent of the total area of the outer major surface 112; (iii) about 2 to 5 percent of the total area of the outer major surface 112; and (iv) about 2 to 3 percent of the total area of the outer major surface 112. This limitation on the coated area is important in order to address the possibility that the coating 104 improves the resistance to impact fractures of the glass substrate 102 at the undue expense of reducing the flexural strength of the glass substrate 102 at the Thickness and Coating Application As to the thickness of the coating 104, such thickness may be attained via one layer or multiple layers, reaching one of: (i) between about 10 nanometers to about 1000 micrometers; (ii) between about 100 nanometers to about 500 micrometers; (iii) between about 1 micrometer to about 100 micrometers; and (iv) between about 10 micrometer to about 50 micrometers.

Figure 5:
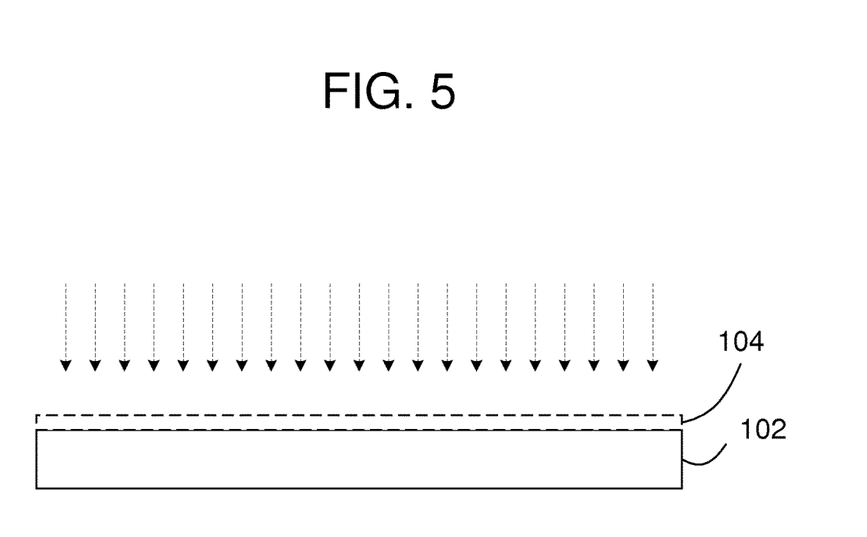
FIG. 5 is a schematic view of an uncoated cover substrate being subject to a coating process in order to form a partial coating on a surface of the cover substrate.

Reference is now made to FIG. 5, which is a schematic view of an uncoated glass substrate 102 being subject to a coating process in order to form a partial coating 104 on one of the major surfaces thereof. The aforementioned coating thicknesses (and limited areas of application) may be achieved by pre-treating the glass substrate 102 to receive the coating 104, for example by cleaning, acid polishing and/or otherwise treating the glass substrates 102 to remove or reduce the adverse effects of surface flaws. Any of the known masking techniques may be employed to ensure that the coating 104 is applied only in desired areas 122$i$, 124$i$. The coating 104 may be applied to the raw substrate 102 via vapor deposition techniques, which may include sputtering, plasma enhanced chemical vapor deposition (PECVD), or electron (E-beam) evaporation techniques. Those skilled in the art will appreciate, however, that the particular mechanism by which the coating 104 is applied is not strictly limited to the aforementioned techniques, but rather may be selected by the artisan in order to address the exigencies of a particular product application or manufacturing goal.

In one or more alternative embodiments, an intermediate coating (not shown) may be disposed between the glass substrate 102 and the coating 104.

Plastically Deformable Coating

In accordance with one or more embodiments, the coating 104 may be formed from a plastically deformable material exhibiting a spring-like response to the dynamic sharp impact to the outer major surface 112 of the glass substrate 102.

By way of example, when the coating 104 is formed from a plastically deformable material, including one or more of Polymethylmethacrylate (PMMA), Polycarbonate (PC), cycloolefin polymer (COP) and copolymer (COC) known as Zeonex and Topas, Polyethylene terephthalate (PET), Polyethylene naphthalate (PEN), Polystyrene, Acrylic, Silicon, Polyurethane elastomer, Polyvinyl Butyral (PVB), Poly Vinyl Chloride (PVC), Thermoplastic Elastomer (TPE) such as Styrene Block Copolymer, where the one or more materials listed above have a Modulus ranging from about 1 MPa to about 10 GPa.

Additionally and/or alternatively, when the coating 104 is formed from a plastically deformable material, the coating 104 preferably exhibits a modulus of one of: (i) less than about 1 GPa; (ii) less than about 5 GPa; (iii) less than about 10 GPa; (iv) less than about 30 GPa; and (v) less than about 50 GPa.

The spring-like properties of the coating 104 may be characterized by the dynamics of an impact. For example, when the glass substrate 102 hits a rough surface at a certain speed, the plastic deformable material of the coating 104 responds like a spring. The contact force between the glass substrate 102 and the rough surface is directly related to the probability of glass failure due to sharp indentation. Assuming that the mass of the device 10 is m, the velocity at the moment of impact is v, the spring constant of the coating 104 is k, and the maximum spring compression is x, then the energy conservation equation of the system is $$\frac{mv^2}{2} = \frac{kx^2}{2} \text{ and } x = v \cdot \sqrt{\frac{m}{k}}$$

Therefore, plastic deformable springs (k) result in larger spring compression, and the device 10 would have to travel a longer distance to come to a full stop (as compared with no spring-like dynamics). In other words, the device 10 experiences a lower deceleration (as compared with no spring-like dynamics). According to Newton's second law force F=ma, lower acceleration (or deceleration), a, results in a lower force, F, which is the reaction force between the glass substrate 102 and the rough surface at impact. Consequently, employing a plastically deformable material in the coating 104 will reduce the probability of damage to the glass substrate 102 due to sharp impact indentation.

Ultra-Hard Coating

In accordance with one or more further embodiments, the coating 104 may be formed from an ultra-hard material in order to increase the harness of the outer major surface 112 of the glass substrate 102.

Application of an ultra-hard coating 104 to the glass substrate would be directed to improving the hardness of the glass substrate 102, which would increase the resistance to fracture from sharp impact indentation. For example, a raw Gorilla® glass substrate 102 typically has a hardness of about 7 GPa, however, a higher hardness to resist fracture may be on the order of at least about 10 GPa, or alternatively at least 15 GPa and higher. As noted above, the higher hardness may be obtained by applying a coating 104 to the raw glass substrate 102.

For example, when the coating 104 is formed from an ultra-hard material, the coating 104 preferably exhibits a hardness of one of: (i) at least about 8 GPa; (ii) at least about 10 GPa; (iii) at least about 14 GPa; (iv) at least about 18 GPa; (v) at least about 22 GPa; and (vi) at least about 30 GPa.

Additionally and/or alternatively, when the coating 104 is formed from an ultra-hard material, the coating 104 includes one or more of: silicon nitrides, silicon oxy-nitrides, silicon carbides, silicon oxy-carbides, aluminum nitrides, aluminum oxy-nitrides (AlON), aluminum carbides, aluminum oxy-carbides, aluminum oxides, diamond-like carbon, nanocrystalline diamond, oxides, and indium tin oxide (ITO). Further examples of materials for the coating 104 may include one or more of $MgAl_2O_4$, $CaAl_2O_4$, nearby compositions of $MgAl_2O_{4-x}$, $MgAl_2O_{4-x}$, $Mg_{(1-y)}Al_{(2+y)}O_{4-x}$, and/or $Ca_{(1-y)}Al_{(2+y)}O_{4-x}$, $SiO_xC_y$, $SiO_xC_yN_z$, Al, AlN, $AlN_xO_y$, $Al_2O_3$, $Al_2O_3/SiO_2$, BC, BN, DLC, Graphene, $SiCN_x$, $SiN_x$, $SiO_2$, SiC, $SnO_2$, $SnO_2/SiO_2$, $Ta_3N_5$, TiC, TiN, $TiO_2$, and/or $ZrO_2$.

Glass Partitioning Technique

As noted above, another technique for addressing sharp contact failures involves providing one or more mechanisms to partition the glass substrate 102 in one or more strategic locations in order to isolate fracturing, mitigate crack propagation, and/or prevent fracturing of the central region 102-1 of the glass substrate 102. Due to the geometry of many devices 10, the corners of the glass substrate 102 are regions in which sharp impact failures are likely to initiate. Thus, strategic location of partitioning mechanisms relative to the corners of the glass substrate 102 may result in preventing the propagation of cracks that initiate proximate to the corners into the central region 102-1, and therefore improvement in the drop characteristics of the device 10 from the user's perspective.

Figure 6:
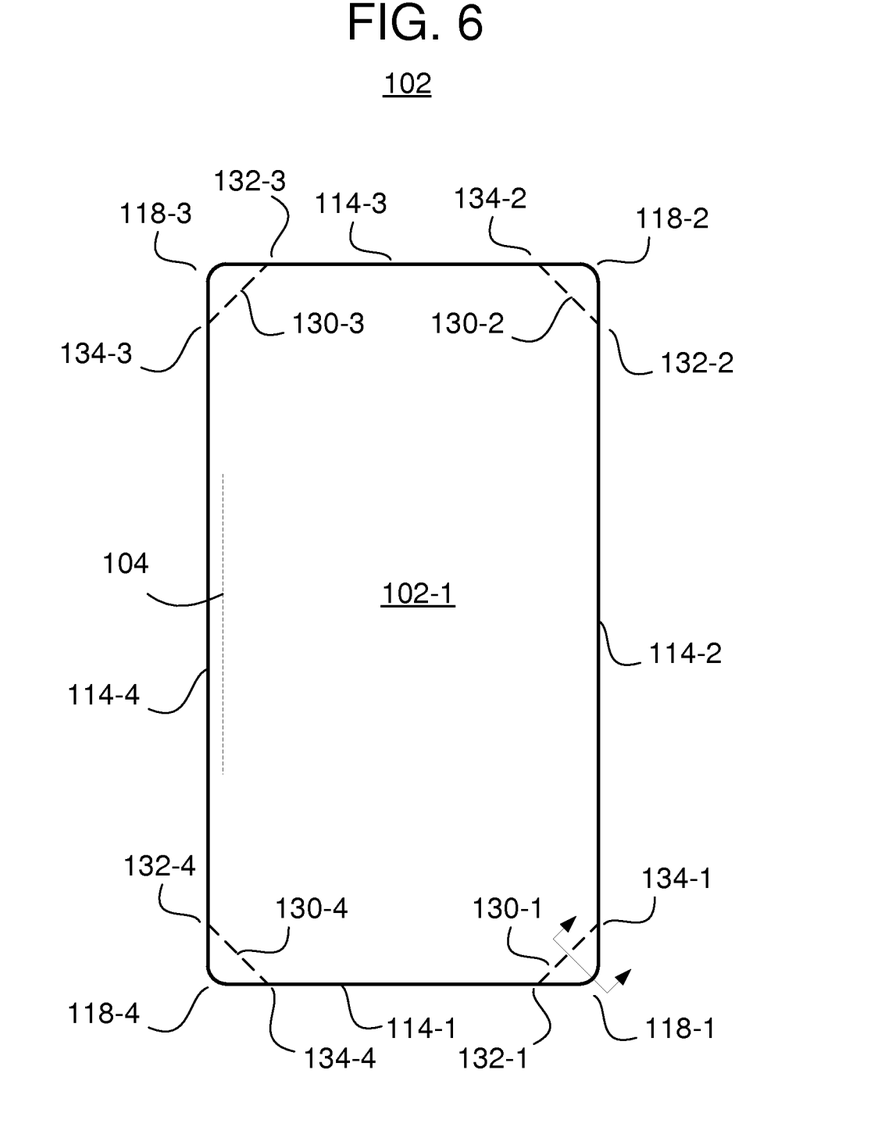
FIG. 6 is a schematic illustration of a cover substrate that includes one or more isolation mechanisms for mitigating crack propagation after initiation of a sharp impact failure.

In this regard, reference is made to FIG. 6, which is a schematic illustration of a glass substrate 102 that includes one or more isolation mechanisms 130 for mitigating crack propagation after initiation of a sharp impact failure. Each isolation mechanism operates to at least one of: (i) interrupt crack propagation resulting from a dynamic sharp impact to the outer major surface 112 of the glass substrate 102 originating at or near the corner 118, (ii) direct the crack propagation toward (e.g., laterally) one or more adjacent edge surfaces 114, and/or (iii) mitigate crack propagation across the isolation mechanism 130 from the corner 118 toward the central region 102-1 of the glass substrate 102.

Given that the isolation mechanisms 130 interrupt, redirect, and/or mitigate certain crack propagation dynamics, they may be though of as mechanisms that provide "discontinuities", at least with respect to crack propagation. In this regard, a discontinuity may be achieved by providing one or more of: a trench, notch, indentation, recess, score, undercut, glass strength modification, residual stress modification, etc. within the volume of the glass substrate 102. The discontinuity may be elongate and extend at least partially through a thickness of the glass substrate 102.

Figure 7:
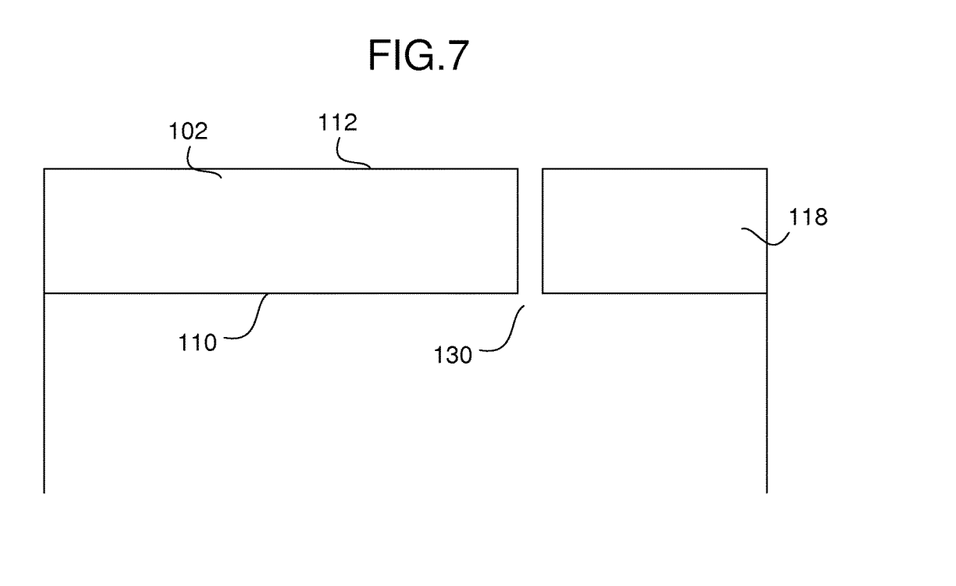
FIG. 7 is a cross-sectional view of one or more embodiments of an isolation mechanism suitable for use in the cover substrate of FIG. 6.
Figure 8:
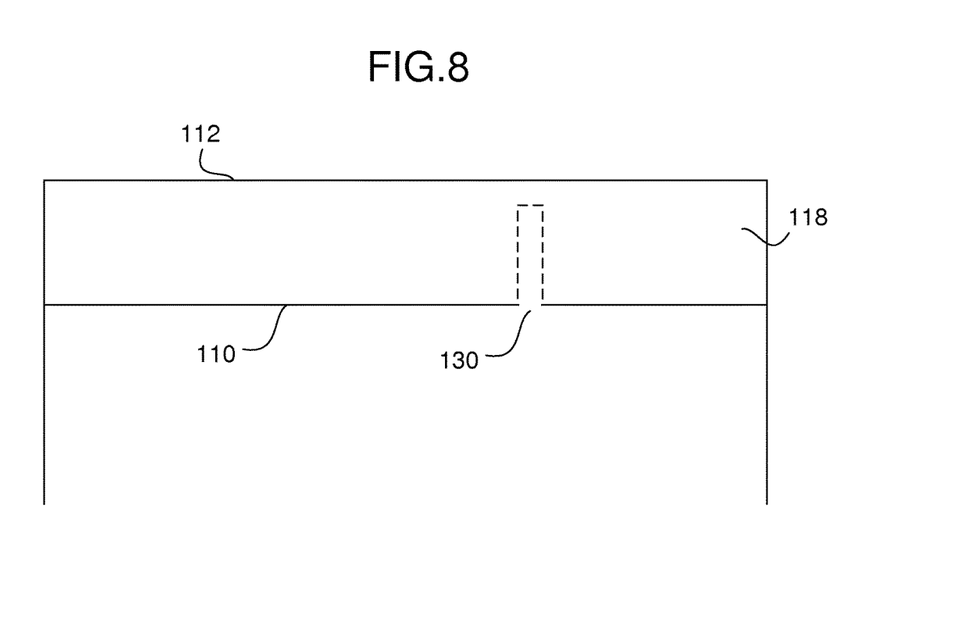
FIG. 8 is a cross-sectional view of one or more further embodiments of an isolation mechanism suitable for use in the cover substrate of FIG. 6.

For example, with reference to FIG. 7, the elongate discontinuity 130 may extend completely through the thickness of the glass substrate 102 between the inner and outer major surfaces 110, 112 thereof, thereby separating the glass substrate 102 into respective portions. Alternatively, with reference to FIG. 8, the elongate discontinuity 130 may extend only partially through the thickness of the glass substrate 102, preferably separating the inner major surface 110 and extending toward, but not through to, the outer major surface 112. In either case, even if the device 10 is dropped and a sharp impact failure initiates at, for example, the corner 118 of the glass substrate 102, the discontinuity (e.g., partitioning) would result in the arrest of any crack propagation toward and/or into the central region 102-1 of the glass substrate 102.

More specifically, a first elongate discontinuity 130-1 may be disposed adjacent to a first corner 118-1 of the glass substrate 102. By way of further detail (and further example), the first elongate discontinuity 130-1 may have a proximal end 132-1 and a distal end 134-1. The proximal end 132-1 may be located at, or at least adjacent to, the first edge surface 114-1. The distal end 134-1 may be located at, or at least adjacent to, the second edge surface 114-2, which is adjacent to the first edge surface 114-1. Thus, the first elongate discontinuity 130-1 is disposed in proximity to (or in spaced relation to) the first corner 118-1 (and the first corner surface 116-1) of the glass substrate 102. Therefore, the first isolation mechanism 130-1 may interrupt crack propagation resulting from a dynamic sharp impact to the outer major surface 112 of the glass substrate 102 originating at or near the first corner 118-1, such as originating between the peripheral edge 112-1 and the first elongate discontinuity 130-1. Additionally and/or alternatively, the first isolation mechanism 130-1 may direct the crack propagation toward at least one of the first and second adjacent edge surfaces 114-1, 114-2, and/or mitigate crack propagation across the first elongate discontinuity 130-1 toward the central region 102-1 of the glass substrate 102.

Alternatively, a second elongate discontinuity 130-2 may be disposed adjacent to (or in proximity to, or in spaced relation to) a second corner 118-2 (and the second corner surface 116-2) of the glass substrate 102. For example, the second elongate discontinuity 130-2 may have a proximal end 132-2 located at, or at least adjacent to, the second edge surface 114-2, and a distal end 134-2 located at, or at least adjacent to, the third edge surface 114-3. A further alternative may involve a third elongate discontinuity 130-3 disposed adjacent to (or in proximity to, or in spaced relation to) a third corner 118-3 (and the third corner surface 116-3) of the glass substrate 102. The third elongate discontinuity 130-3 may have a proximal end 132-3 located at, or at least adjacent to, the third edge surface 114-3, and a distal end 134-3 located at, or at least adjacent to, the fourth edge surface 114-4. Still further, a fourth elongate discontinuity 130-4 may be disposed adjacent to a fourth corner 118-4 of the glass substrate 102, which includes a proximal end 132-4 located at, or adjacent to, the fourth edge surface 114-4, and a distal end 134-4 located at, or adjacent to, the first edge surface 114-1.

In the case of one or more elongate discontinuities 130-$i$ in the form of a trench, notch, indentation, recess, score, undercut, etc., such void may be filled with an plastically deformable (and/or transparent) material.

In addition, the glass substrate 102 of FIG. 6 may also include the coating 104$i$ on any number of the partial areas 122$i$, 124$i$ discussed in previous embodiments.

Energy Absorbing Via Microspheres
Intermediate Layer on Backside of Cover Substrate Another technique for addressing sharp contact failures involves providing an energy absorbing intermediate layer on a back side of the cover substrate 102. For example, with reference to FIG. 9, a device body 200 (such as a smartphone or the like) includes the cover substrate 102 (such as a glass substrate), which is similar to some of the configurations discussed in one or more of the embodiments above. Notably, however, an energy absorbing intermediate layer 202 (which may also operate as an adhesive layer) is disposed between the device body 200 and the cover substrate 102. The intermediate layer 202 operates to absorb a majority of kinetic energy produced from a dynamic sharp impact by a surface 12 (such as illustrated in FIG. 2) to the outer major surface 112 of the cover substrate 102 and to thereby mitigate damage to the cover substrate 102 and the device body 200.

Figure 9:
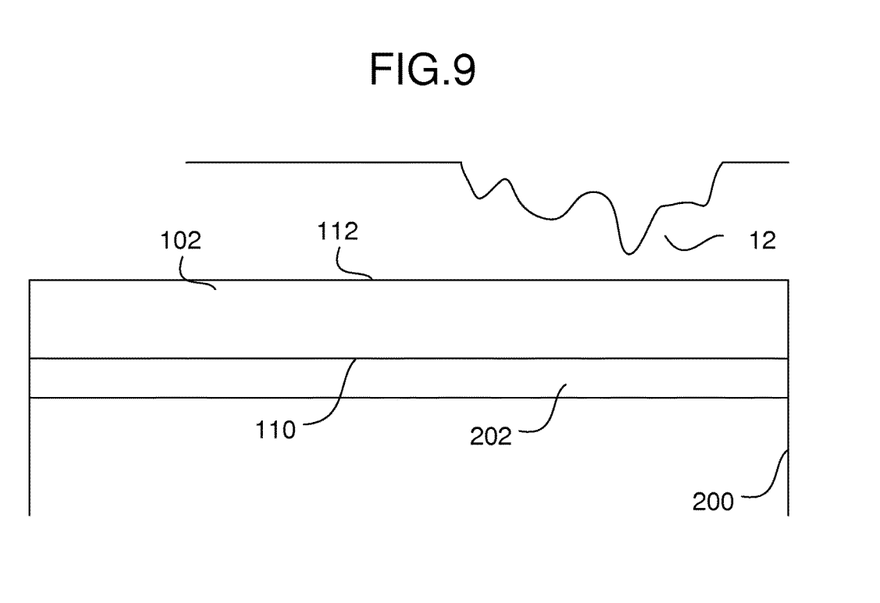
FIG. 9 is a cross-sectional view of one or more embodiments of an energy absorbing intermediate layer applied between a cover substrate and a body of a device.

Given the configuration illustrated in FIG. 9, one can consider the theoretical mechanisms that come to bear in connection with the intermediate layer 202 absorbing the kinetic energy produced from a dynamic sharp impact—thereby reducing damage to the cover substrate 102. It is observed that the kinetic energy that is generated through conversion of the potential energy of the device at impact is directly related to a probability of failure of the cover substrate 102 (such as via cracking). Assuming the device drops from a height (h), the kinetic energy of the device is given by the following formula:

$$E_{KE} = E_{PE} = mgh = \frac{mv^2}{2}$$

where $E_{KE}$ is the kinetic energy of the device; $E_{PE}$ is the potential energy of the device at height (h), m is the mass of the device, v is the velocity at the moment of impact, and g is the acceleration constant due to gravity.

When the cover substrate 102 impacts a surface 12 (such as any of a number of rough surfaces found in daily life) at a given speed, the kinetic energy is focused on a small area of contact of the cover substrate 102. Such focus, especially sharp contact impact with the rough surface 12, may generate an enormous amount of pressure. An effective measure for preventing excessive damage to the cover substrate 102 and/or the device body 200 during an impact is to at least partially absorb forces generated by the momentum of the device at impact. Currently, many devices are designed with the cover substrate coupled to the device body 200 via an adhesive, such as an optically clear adhesive (OCA). The adhesive may be typically formed from elastomeric materials that have a relatively low Young's modulus, such as in the range of about 1-10 MPa. With such relatively low Young's modulus, the adhesive layer will tend to deform immediately during an impact (resulting in very little elastically stored strain energy in the adhesive), and therefor little kinetic energy is absorbed by the adhesive. Thus, the majority of the kinetic energy due to impact is focused on the aforementioned small area of contact of the cover substrate 102 by the rough surface 12, which often results in catastrophic failure of the cover substrate 102 and/or other sensitive elements of the device.

In accordance with certain energy absorbing features of the intermediate layer 202 of FIG. 9, however, one may view advantages thereof from a simple energy conservation viewpoint, expressed as follows:

$$E_{DE} = E_{KE} - E_{Dissipated} - E_{SE}$$

where $E_{DE}$ is the kinetic energy available to cause damage to the device, $E_{KE}$ is the kinetic energy of the device, $E_{Dissipated}$ is the energy dissipated by certain materials within the intermediate layer 202, and $E_{SE}$ is the strain energy due to elastic deformation of any number of components in of the device, which will be released back into the system after impact. Clearly, there is substantial advantage in producing an intermediate layer 202 (such as via modified properties of the adhesive layer) that absorbs significant levels of the kinetic energy of the device resulting from impact, thereby leaving less energy available to cause damage to the device.

Figure 10:
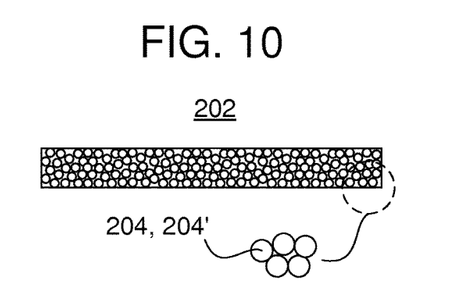
FIG. 10 is an illustration of certain details of one or more embodiments of the energy absorbing intermediate layer suitable for use in the embodiments illustrated in FIG. 9.
Figure 11:
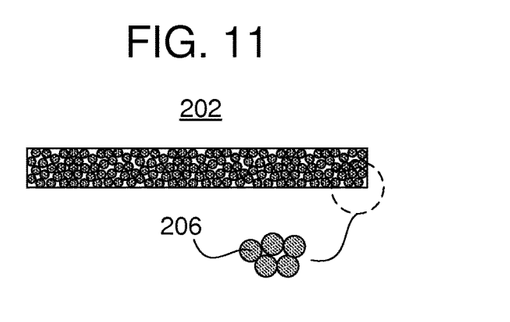
FIG. 11 is an illustration of alternative details of one or more embodiments of the energy absorbing intermediate layer suitable for use in the embodiments illustrated in FIG. 9.

In accordance with one or more embodiments of the system illustrated in FIGS. 9, 10, 11, the energy absorbing material of the intermediate layer 202 may be composed of spheres 204 and/or spheres 206, which are bound together via a polymeric binder, an elastomeric binder, and/or a resin. Some notable and differing features of each of the spheres 204 and the spheres 206 will be discussed in more detail below. Preferably, the spheres 204 and/or 206 are substantially uniformly distributed throughout the binder or resin. The spheres 204 and/or 206 are preferably substantially spherically shaped, having diameters in the 10's of microns, for example, having a mean diameter between about 5-120 um. To some extent, the mean diameter of the spheres 204 and/or 206 will dictate the thickness of the intermediate layer 202, which may vary from about 50 um to about 1000 um thick. The coating material of the intermediate layer 202 may be transparent in areas where transparency is required or desired, and may be fully or partially opaque in areas where full transparency is neither required nor desired.

The intermediate later 202 containing the spheres 204 and/or spheres 206 responds as a sacrificial layer, such that in the event of device impact by the rough surface 12, a significant amount of the kinetic energy of the device will be dissipated by crushing, compressing, and or otherwise deforming the plurality of spheres 204 and/or spheres 206. Therefore, the amount of remaining kinetic energy available to cause damage to the device is reduced.

In the embodiment of FIG. 10, the spheres 204 may be characterized as hollow and crushable, such as being formed from a rigid, but crushable, material, such as glass, ceramic, and/or glass ceramic hollow spheres. Thus, the intermediate later 202 containing the crushable, hollow spheres 204 responds as a sacrificial layer, such that in the event of device impact by a rough surface 12, a significant amount of the kinetic energy of the device will be dissipated by crushing the hollow, crushable spheres 204.

In one or more embodiments, the intermediate layer 202 may include the hollow, crushable spheres 204 in a polymeric binder, where a volume fraction of the hollow, crushable spheres 204 is between about 25-75% of a total volume of the hollow, crushable spheres 204 and the polymeric binder. Additionally and/or alternatively, the combination may include one or more of: a mean diameter of the hollow, crushable spheres 204 being between about 5-120 um; a crush strength of the hollow, crushable spheres 204 being between about 2 MPa-200 MPa; a thickness of the intermediate layer 202 being between about 50-1000 um; and the hollow, crushable spheres 204 being formed from glass, ceramic, and/or glass-ceramic material.

A method of forming the aforementioned intermediate layer 202 containing the hollow, crushable spheres 204 may include: (1) preparing a substantially uniformly mixed solution of the aforementioned proportions of hollow, crushable spheres 204 (e.g., silicate glass hollow microspheres) and a liquid resin, such as 3M™ Printable Liquid Optically Clear Adhesive 1088; (2) coating or screen printing the mixture on suitable portions of the cover substrate 102 (e.g., edges, corners, and/or the aforementioned other limited areas of the cover substrate 102 but applied to the inner major surface 110 instead of the outer major surface 112 thereof); (3) placing the cover substrate 102 and mixture in contact with the device body 200 (such as a frame of the device); and (4) curing the liquid OCA. Due to the elasticity of the polymeric bonding material, the intermediate layer 202 will maintain its original shape even after deformation of the spheres 204 embedded therein.

In one or more further embodiments, the intermediate layer 202 may include compressible, hollow spheres 204' (instead of the hollow, crushable spheres 204) in a resin. Thus, the intermediate later 202 containing the compressible, hollow spheres 204' responds as a sacrificial layer, such that in the event of device impact by a rough surface 12, a significant amount of the kinetic energy of the device will be dissipated by compressing the compressible, hollow spheres 204'. By way of example, such a configuration may include a volume fraction of the compressible, hollow spheres 204' of between about 25-90% of a total volume of the compressible, hollow spheres 204' and the resin. Additionally and/or alternatively, the combination may include one or more of: a mean diameter of the compressible, hollow spheres 204' being between about 20-120 um; and a thickness of the intermediate layer 202 being between about 50-1000 um.

A method of forming the aforementioned intermediate layer 202 containing the compressible, hollow spheres 204' may include: (1) preparing a substantially uniformly mixed solution of the aforementioned proportions compressible, hollow microspheres (such as AkzoNobel Expancel microspheres) and a liquid OCA resin (such as 3M™ Printable Liquid Optically Clear Adhesive 1088); (2) coating or screen printing the mixture on suitable portions of the cover substrate 102 (e.g., edges, corners, and/or the aforementioned other limited areas of the cover substrate 102 but applied to the inner major surface 110 instead of the outer major surface 112 thereof); (3) placing the cover substrate 102 and mixture in contact with the device body 200 (such as a frame of the device); and (4) curing the liquid OCA. Due to the relatively high resiliency of Expancel microspheres, the intermediate layer 202 may withstand several cycles of loading/unloading without breaking.

In one or more further embodiments, the intermediate layer 202 may include compressible, solid spheres 206 in a binder as illustrated in FIG. 11. Thus, in this configuration, the intermediate later 202 responds as a sacrificial layer, such that in the event of device impact by the rough surface 12, a significant amount of the kinetic energy of the device will be dissipated by compressing the compressible, solid spheres 206. By way of example, such a configuration may include a volume fraction of the compressible solid spheres 206 being between about 25-75% of a total volume of the compressible solid spheres 206 and the binder. Additionally and/or alternatively, the combination may include one or more of: a mean diameter of the compressible solid spheres 206 being between about 10-1000 um; a thickness of the intermediate layer 202 being between about 50-1000 um; and the compressible solid spheres 206 being formed from one or more of polyethylene, polystyrene, and polymethylmethacrylate.

Figure 12:
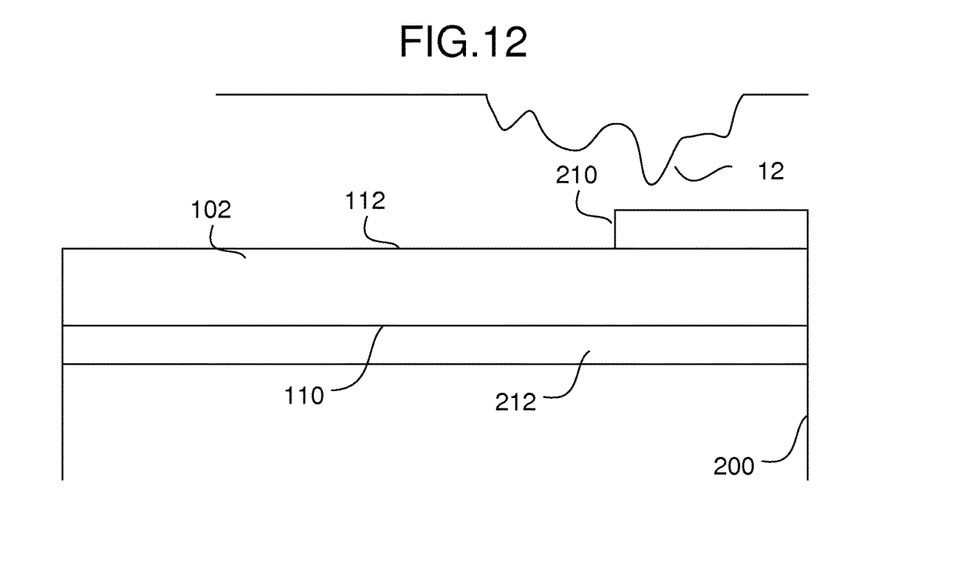
FIG. 12 is a cross-sectional view of one or more embodiments of an energy absorbing coating applied to an outer surface of a cover substrate of a device.

With reference to FIG. 12, and in accordance with one or more further embodiments, the aforementioned spheres 204 and/or spheres 206 bound in the polymeric binder, elastomeric binder, and/or resin may provide an energy absorbing layer (or coating) 210 on the outer major surface 112 of the cover substrate 102. Notably, the aforementioned intermediate layer 202 or a standard adhesive layer 212 may be disposed between the device body 200 and the cover substrate 102. The energy absorbing coating 210 operates to absorb a majority of kinetic energy produced from a dynamic sharp impact by the surface 12 to the outer major surface 112 of the cover substrate 102, specifically to the coating 210, and to thereby mitigate damage to the cover substrate 102 and the device body 200. In accordance with these embodiments, the energy absorbing coating 210 may be applied over the aforementioned limited area of the outer major surface 112 of the cover substrate 102 to produce a composite structure. Therefore, all of the various features and alternatives of the previous embodiments concerning the characteristics of the limited area, the characteristics of the spheres 204, 206, and/or the characteristics of the polymeric binder, elastomeric binder, and/or resin may be applied to the embodiments contemplated with reference to FIG. 12.

Figure 13:
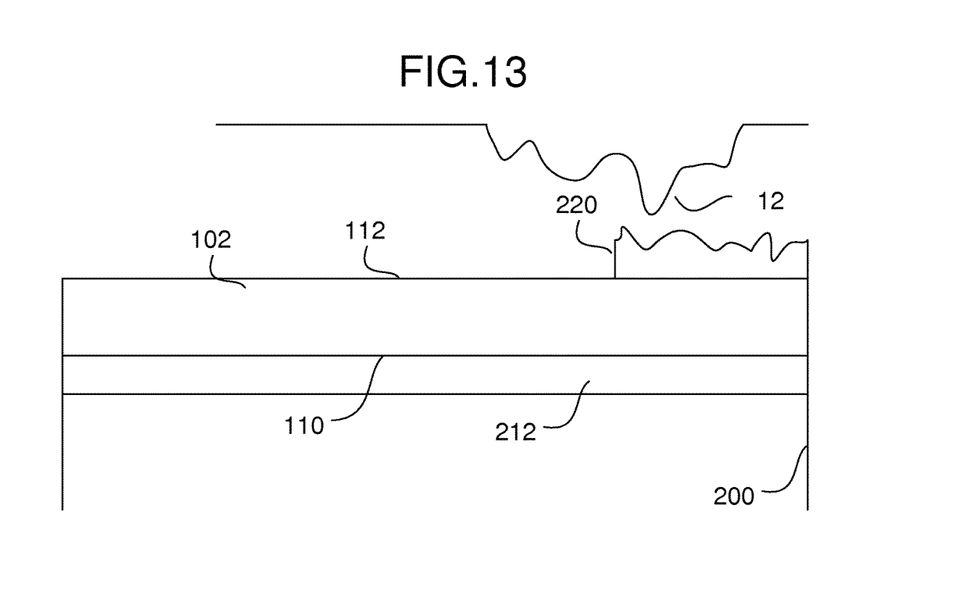
FIG. 13 is a cross-sectional view of one or more embodiments of an alternative energy absorbing coating applied to an outer surface of a cover substrate of a device.

With reference to FIG. 13, and in accordance with one or more further embodiments, another type of energy absorbing layer (or coating) 220 may be applied on the outer major surface 112 of the cover substrate 102. The energy absorbing coating 220 includes a rough outer surface having a roughness that is substantially similar to a roughness of the surface 12. Notably, the aforementioned intermediate layer 202 or a standard adhesive layer 212 may be disposed between the device body 200 and the cover substrate 102. By virtue of the similarities of roughness between the coating 220 and the surface 12, at least the energy absorbing coating 220 operates to absorb a majority of kinetic energy produced from a dynamic sharp impact by the surface 12 to the outer major surface 112 of the cover substrate 102, specifically to the coating 220, and to thereby mitigate damage to the cover substrate 102 and the device body 200. In accordance with these embodiments, the energy absorbing coating 220 may be applied over the aforementioned limited area of the outer major surface 112 of the cover substrate 102 to produce a composite structure. Therefore, all of the various features and alternatives of the previous embodiments concerning the characteristics of the limited area may be applied to the embodiments contemplated with reference to FIG. 13.

Although the disclosure herein has been described with reference to particular embodiments, it is to be understood that these embodiments are merely illustrative of the principles and applications of the embodiments herein. It is therefore to be understood that numerous modifications may be made to the illustrative embodiments and that other arrangements may be devised without departing from the spirit and scope of the present application.

What is claimed is:

1. An article, comprising:
 a substrate having inner and outer major surfaces spaced apart from one another, a plurality of edge surfaces spanning between respective peripheral edges of the inner and outer major surfaces, and a plurality of corner surfaces spanning between the respective peripheral edges of the inner and outer major surfaces and between adjacent ones of the edge surfaces; and
 a first elongate discontinuity having a proximal end and a distal end, the proximal end being located at, or adjacent to, a first of the plurality of edge surfaces, and the distal end being located at, or adjacent to, a second of the plurality of edge surfaces, adjacent to the first of the plurality of edge surfaces, such that the first elongate discontinuity is disposed in proximity to a first of the corner surfaces of the substrate,
 wherein the first elongate discontinuity is filled with a plastically deformable material, and the first elongate discontinuity operates to: (i) interrupt crack propagation resulting from a dynamic sharp impact to the outer major surface of the substrate originating between the peripheral edge and the first elongate discontinuity, (ii) direct the crack propagation toward at least one of the first and second edge surfaces, and (iii) mitigate crack propagation across the first elongate discontinuity toward a central region of the outer major surface of the substrate,
 wherein the first elongate discontinuity extends completely through a thickness of the substrate between the inner and outer major surfaces thereof, thereby separating the substrate.

2. The article of claim 1, wherein the substrate is an ion exchanged glass.

3. The article of claim 1, further comprising a second elongate discontinuity having a proximal end and a distal end, the proximal end being located at, or adjacent to, a third of the plurality of edge surfaces, and the distal end being located at, or adjacent to, a fourth of the plurality of edge surfaces, adjacent to the third of the plurality of edge surfaces, such that the second elongate discontinuity is disposed in proximity to a second of the corner surfaces of the substrate.

4. The article of claim 3, further comprising a third elongate discontinuity having a proximal end and a distal end, the proximal end being located at, or adjacent to, the second of the plurality of edge surfaces, and the distal end being located at, or adjacent to, the third of the plurality of edge surfaces, adjacent to the second of the plurality of edge surfaces, such that the third elongate discontinuity is disposed in proximity to a third of the corner surfaces of the substrate.

5. The article of claim 4, further comprising a fourth elongate discontinuity having a proximal end and a distal end, the proximal end being located at, or adjacent to, the fourth of the plurality of edge surfaces, and the distal end being located at, or adjacent to, the first of the plurality of edge surfaces, adjacent to the fourth of the plurality of edge surfaces, such that the fourth elongate discontinuity is disposed in proximity to a fourth of the corner surfaces of the substrate.

6. The article of claim 1, wherein at the substrate is formed from one or more of crystalline material, single crystal material, and glass ceramic material.

7. The article of claim 1, wherein the plastically deformable material is transparent.

8. The article of claim 1, wherein the plastically deformable material exhibits a Young's modulus of less than about 50 GPa.

9. The article of claim 1, wherein the plastically deformable material exhibits a Young's modulus of less than about 1 GPa.

10. The article of claim 1, wherein the plastically deformable material exhibits a Young's modulus ranging from about 1 MPa to about 10 GPa.

11. The article of claim 1, wherein the plastically deformable material includes one or more of Polymethylmethacrylate (PMMA), Polycarbonate (PC), cycloolefin polymer (COP), cycloolefin copolymer (COC), Polyethylene terephthalate (PET), Polyethylene naphthaiate (PEN), Polystyrene, Acrylic, Silicon, Polyurethane elastomer, Polyvinyl Butyral (PVB), Poly Vinyl Chloride (PVC), Thermoplastic Elastomer (TPE), and Styrene Block Copolymer.

12. An article, comprising:
 a substrate having inner and outer, major surfaces spaced apart from one another, a plurality of edge surfaces spanning between respective peripheral edges of the inner and outer major surfaces, and a plurality of corner surfaces spanning between the respective peripheral edges of the inner and outer major surfaces and between adjacent ones of the edge surfaces; and a first elongate discontinuity having a proximal end and a distal end, the proximal end being located at, or adjacent to, a first of the plurality of edge surfaces, and the distal end being located at, or adjacent to, a second of the plurality of edge surfaces, adjacent to the first of the plurality of edge surfaces, such that the first elongate discontinuity is disposed in proximity to a first of the corner surfaces of the substrate, wherein the first elongate discontinuity extends completely through a thickness of the substrate between the inner and outer major surfaces thereof, thereby separating the substrate, and the first elongate discontinuity operates to: (i) interrupt crack propagation resulting from a dynamic sharp impact to the outer major surface of the substrate originating between the peripheral edge and the first elongate discontinuity, (ii) direct the crack propagation toward at least one of the first and second edge surfaces, and (iii) mitigate crack propagation across the first elongate discontinuity toward a central region of the outer major surface of the substrate.

13. The article of claim 12, further comprising a second elongate discontinuity having a proximal end and a distal end, the proximal end being located at, or adjacent to, a third of the plurality of edge surfaces, and the distal end being located at, or adjacent to, a fourth of the plurality of edge surfaces, adjacent to the third of the plurality of edge surfaces, such that the second elongate discontinuity is disposed in proximity to a second of the corner surfaces of the substrate.

14. The article of claim 13, further comprising a third elongate discontinuity having a proximal end and a distal end, the proximal end being located at, or adjacent to, the second of the plurality of edge surfaces, and the distal end being located at, or adjacent to, the third of the plurality of edge surfaces, adjacent to the second of the plurality of edge surfaces, such that the third elongate discontinuity is disposed in proximity to a third of the corner surfaces of the substrate.

15. The article of claim 14, further comprising a fourth elongate discontinuity having a proximal end and a distal end, the proximal end being located at, or adjacent to, the fourth of the plurality of edge surfaces, and the distal end being located at, or adjacent to, the first of the plurality of edge surfaces, adjacent to the fourth of the plurality of edge surfaces, such that the fourth elongate discontinuity is disposed in proximity to a fourth of the corner surfaces of the substrate.

* * * * *

UNITED STATES PATENT AND TRADEMARK OFFICE
CERTIFICATE OF CORRECTION

PATENT NO. : 10,590,032 B2
APPLICATION NO. : 15/514596
DATED : March 17, 2020
INVENTOR(S) : Petr Gorelchenko et al.

It is certified that error appears in the above-identified patent and that said Letters Patent is hereby corrected as shown below:

In the Claims

In Column 18, Line 59, Claim 11, delete "Polyethylene naphthaiate" and insert -- Polyethylene naphthalate --, therefor.

In Column 18, Line 64, Claim 12, delete "outer," and insert -- outer --, therefor.

Signed and Sealed this
First Day of September, 2020

Andrei Iancu
*Director of the United States Patent and Trademark Office*